(12) United States Patent
Parker et al.

(10) Patent No.: US 6,859,683 B2
(45) Date of Patent: Feb. 22, 2005

(54) INTEGRATED ROBOTIC CELL

(75) Inventors: Robert H. Parker, Harvest, AL (US);
Michael E. Salmon, Madison, AL (US); Gary L. Dumer, Union Grove, AL (US); Gary C. Wheat, Jr., Meridianville, AL (US)

(73) Assignee: Futaba Corporation of America, Schanmburg, IL (US)

( * ) Notice: Subject to any disclaimer, the term of this patent is extended or adjusted under 35 U.S.C. 154(b) by 4 days.

(21) Appl. No.: 10/158,283

(22) Filed: May 30, 2002

(65) Prior Publication Data

US 2002/0193909 A1 Dec. 19, 2002

Related U.S. Application Data

(60) Provisional application No. 60/296,085, filed on Jun. 4, 2001.

(51) Int. Cl.$^7$ ............................. G05B 15/00; G05B 19/00
(52) U.S. Cl. ..................... 700/259; 700/245; 700/247; 700/253; 700/257; 318/567; 318/568.23; 318/568.25; 901/4; 901/41
(58) Field of Search ................................. 700/245, 247, 700/253, 259, 257; 318/567, 568.23, 568.25; 209/578, 587, 705, 942; 382/143, 224; 901/4, 41

(56) References Cited

U.S. PATENT DOCUMENTS

| | | | | |
|---|---|---|---|---|
| 4,608,525 A | * | 8/1986 | Mori et al. | ................... 700/248 |
| 4,815,190 A | * | 3/1989 | Haba et al. | ..................... 29/430 |
| 4,835,730 A | * | 5/1989 | Shimano et al. | ............ 700/257 |

(List continued on next page.)

FOREIGN PATENT DOCUMENTS

| | | |
|---|---|---|
| DE | 2312876 A | 11/1997 |
| JP | 2000-181522 | 6/2000 |

OTHER PUBLICATIONS

Marck, Minimally invasive and robotic surgery, 2001, Internet, pp. 568–572.*

Schubert et al., Space construction: an exparimental testbed to develop enabling technologies, 1997, Internet, pp. 1–10.*

Marchand et al., From Data–Flow Task to Multitasking: Applying the Synchronous Approach to Active Vision in Robotics, 1997, Internet/IEEE, pp. 200–216.*

Fidan et al., An Objected–Oriented User Interface for Controlling a Multi–Purpose Robot Cell, 1995, Internet/IEEE, pp. 506–507□□.*

Montagnier et al. Design Of A Graphical User Interface (GUI) Between a PC–Based CAD System And A Flexible Assembly Robotic Cell, 1997, Internet, pp. 162–169.*

Sandi, National Laboratories—Albuquerque, NM, Information: A–Primed Robotic Workcell, 1995, 1999, Internet, p 1.*

*Primary Examiner*—William A. Cuchlinski, Jr.
*Assistant Examiner*—McDieunel Marc
(74) *Attorney, Agent, or Firm*—Thomas, Kayden, Horstemeyer & Risley, L.L.P.

(57) ABSTRACT

An integrated robotic cell having robot and series of sensors is able to process a component as desired by an operator using an interactive interface display. The integrated robotic cell includes a robotic arm connected a central processor unit as well as a series of monitors and sensors that thoroughly supervise the operation of the robotic arm and component to verify that there are no errors. The central processing unit is connected to the interface display, which allows the operator to control the operation of the robotic cell. The interface display incorporates a series of threads, with each thread having of a series of sequential processes to be performed by the robotic cell. The operator is thereby able to view and easily control the simultaneous processes being performed in the robotic cell.

15 Claims, 14 Drawing Sheets

U.S. PATENT DOCUMENTS

| | | |
|---|---|---|
| 4,901,221 A | 2/1990 | Kodosky et al. |
| 5,268,837 A | 12/1993 | Saylor |
| 5,475,797 A * | 12/1995 | Glaspy et al. .............. 700/247 |
| 5,515,599 A * | 5/1996 | Best ............................ 29/705 |
| 5,653,005 A * | 8/1997 | Speller et al. ................ 29/701 |
| 5,768,768 A * | 6/1998 | Best ............................ 29/792 |
| 6,104,397 A | 8/2000 | Ryan et al. |
| 6,124,560 A * | 9/2000 | Roos et al. ................. 209/578 |
| 6,321,137 B1 | 11/2001 | De Smet |
| 6,371,717 B1 | 4/2002 | Grams et al. |
| 6,434,449 B1 | 8/2002 | De Smet |
| 6,462,760 B1 | 10/2002 | Cox, Jr. et al. |

* cited by examiner

Conventional Code

Normal Speed 100 % Acceleration = 100%

Lifts = 1"   | Click For Change |

V1      Flame Camera

V2      Robot Camera

V3      Base Camera

V4

|       | A     | B                 | Comment                       |
|-------|-------|-------------------|-------------------------------|
| Sw 1  | +5v   | To Gripper        | Off = 0Volt = Open Gripper    |
| Sw 2  | +24v  | To Conveyer Motor | Off = 0 Volt = Conveyer Off   |
| 3     |       |                   |                               |
| 4     |       |                   |                               |
| 5     |       |                   |                               |

Dcv Out  1   To Sw 1,A

2   To Safety Curtain

Acv Out  1   To Sw 2,A

Analog I/O  1  Robot Motor 1

2  Robot Motor 2

3  Robot Motor 3

4  Robot Motor 4

Digital I/O  1  Safety Curtain

FIG. 6

INTEGRATED ROBOTIC CELL

This application claims priority from U.S. Provisional Application No. 60/296,085, filed on Jun. 4, 2001.

FIELD OF THE INVENTION

The present invention relates generally to the field of robotic cells, and more specifically to integrated robotic cells that efficiently multitask the operations of the integrated robotic cell.

BACKGROUND OF THE INVENTION

Robots are currently used in manufacturing facilities for many varied tasks. To those not directly involved in the acquisition, set up, programming, and operation it would seem that robots could be trained to do almost anything. However, those skilled in the art of robotics know of many hurdles to very large-scale implementation of robotics, particularly in low volume applications. Current robotics are not reasonably affordable until the task desired to be automated needs to be done approximately 2.5 million times per year.

A robot with a sufficiently robust design to cycle every four seconds can accomplish approximately 13,000 tasks per day on two eight hour shifts, or three million tasks in one year. A robot of this description typically costs about $150,000. Over a typical two-year amortization, this robot costs about 2.5 cents per insertion for amortization costs. The robotic technician's training costs, his maintenance time, power costs, and others probably cost about the same or another $150,000 over two years.

In almost all cases, the task performed by a robot can be done at half the speed with a human. That is, from the example above, the same three million pieces over one year can be done by two people per shift on two shifts, for four man-years. To do this task for two years, six million pieces will be made using eight person-years. In today's world economy, it is very easy to find labor for $3,000 per year or $24,000 for eight-person years. Therefore, in this example, it costs $300,000 ($150,000 robot+$150,000 technician costs) minus $24,000 (or $276,000) more to use robotics.

Although it can be argued the robot has twice that useful life, the next application typically involves a new feeder ($15,000), a new program (one man-week of an engineer whose cost is at least $1,000 per week), a new set of grippers (typically $1,000 minimum), and miscellaneous locators and fixtures. Add to this the ongoing support and maintenance and it is easy to see that the ongoing tasks can cost 2.5 to 3 cents per task.

Other hidden costs include machine malfunction. If a crash occurs due to a broken wire or human error the machine can cause one of the mechanical components to move or be bent by only a few thousandths of an inch. This causes significant cost for parts, re-teaching, and downtime. Some breakdowns are as simple as a bug landing on a sensor, and although it subsequently flies away, a day or more of production may be lost due to the damage caused by the sensor misreading and the lost time troubleshooting this type intermittent problem.

These problems are compounded when lower volume production runs are required, when running only 100,000 tasks whether in one month or one year, it is virtually impossible to justify setting up a robot when a human can do the task. With most simple tasks, a human can be trained in 30 minutes and produce 3,000 tasks per shift easily, and nearly 100,000 tasks can be accomplished in about 30 days. To robotically automate this task, it would typically take the same amount of time to design and build a simple feeder and jaw set and to program the new application. And the people that do these tasks typically are paid much more than the human that would normally perform the task. If you only spend $20,000 for hardware and human time, the 100,000 tasks cost 20 cents each.

SUMMARY OF THE INVENTION

An object of the present invention is to provide a fully integrated robotic cell.

A further object of the present invention is to provide an affordable robotic cell.

A further object of the present invention is to provide a robotic cell having sensor monitors connected to an operational system.

An additional object of the present invention is to provide a graphical user interface with the system to allow simple operation of the robotic cell.

Yet a further object of the present invention is to provide a graphical user interface with the integrated robotic cell that allows the operator to monitor the multiple tasks being performed by the integrated robotic cell.

This invention solves or enhances all obstacles to make ultra wide spread use of robotics feasible in today's economic environment by providing a fully integrated robotic cell, capable of using any robot such as but not limited to Cartesian or SCARA robots. The robotic arm of the preferred embodiment is a SCARA robotic arm. The robotic cell includes a central processor unit, which in the current embodiment is a standard PC. The operating system for the central processing unit can be any type, however the current embodiment uses Windows NT 4.0® due to a balance of cost, performance, ease of use, and abundant software and hardware compatibility. The robotic cell additionally includes a series of monitors and sensors that supervise operation of the robotic arm to verify that there are no errors. Additionally, the central processing unit includes a monitor having a graphical user interface that allows the operator to teach the robotic cell the required commands for accurately controlling the operation of the robotic cell in an expedited manner.

These and other objects and advantages of the invention will become apparent from the following detailed description of the preferred embodiment of the invention.

DETAILED DESCRIPTION OF THE DRAWINGS

The integrated robotic cell is depicted in the appended drawings which form a portion of this disclosure and wherein:

FIG. 6 is a schematic illustration of the graphical user interface used in the present invention for the set up page;

DESCRIPTION OF THE PREFERRED EMBODIMENT

Figure 1:
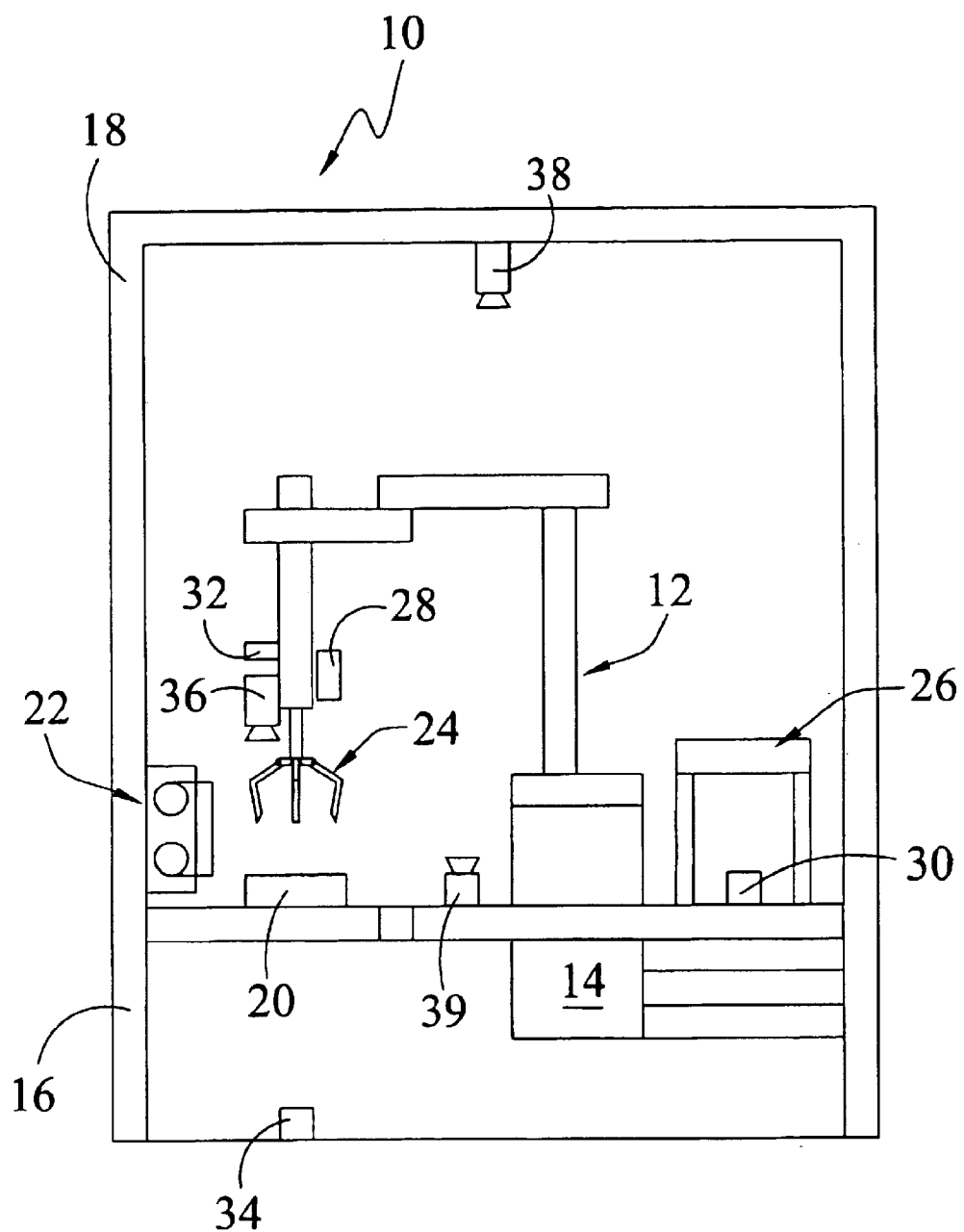
FIG. 1 is a schematic view of an integrated robot cell of the present invention.

Referring now to FIG. 1, the present invention of a fully integrated robotic cell 10 is illustrated. The integrated robotic cell 10 is capable of using any robot such as but not limited to Cartesian or SCARA robots. In the preferred embodiment, a SCARA robotic arm 12 is incorporated into the robotic cell 10. The robotic cell 10 further includes a central processing unit 14, which in the preferred embodiment is a conventional PC. The computer operating system for the central processing unit 14 can be any type; however, the current embodiment employs Windows NT 4.0® due to a balance of cost, performance, ease of use, and abundant software and hardware compatibility.

The robotic cell 10 further includes a base 16 to mount the robotic arm 12, feeders, fixtures, or any other devices that are desirable to locate in a fixed position relative to the robotic arm 12. The base 16 is not necessary in this invention except to the extent it supports the arm 12 in its working position. The robotic cell 10 additionally includes a safety curtain or a frame 18 which are also not necessary as part of the invention but are shown as is used in the current embodiment.

All robotic cells 10 must have a feeder 22, or a means of manipulating one or multiple parts or one or multiple tools, and a fixture 20 to hold the work piece. The feeder 22 can be a conveyor, bowl feeder, a human, a device to present reeled parts, or any other device to bring components or parts to be worked on or combined in the robotic cell 10. In the preferred embodiment, the feeder 22 includes blank labels and a printer ribbon in a label printer to provide printed labels for the items being moved by the robotic arm 12.

Jaws 24 are provided in the current embodiment, with the jaws 24 being a tool mounted to the robotic arm 12 that picks up the label to carry to the work piece. The jaws 24 can be a fixed tool to do work, such as a punch, or a tool to move parts or tools to and from desired locations.

Continuing to view FIG. 1, a conveyor 26 is included in the current embodiment, with the conveyor 26 being one of several fixtures that may be included to transport the part to the work position, hold the part in position while work is being performed, and to transport the part out of the robotic cell 10 upon completion of work.

A bar code label scanner 28 may also be included, with the bar code label scanner 28 being one type of tool that can be attached to the robotic arm 12, and is part of the current embodiment. It should be obvious that any tool or tools desired may be added to the robotic arm 12 consistent with the task at hand.

The present invention additionally includes a series of sensors for monitoring the operation of the robotic cell 10. An input sensor 30 is used in the current embodiment to alert the robotic cell 10 that a work piece is upstream on the conveyor 26, ready for entry into the cell. A reject mechanism 32 is used as an output device in the current embodiment to slide rejected parts out of the mainstream production, and is activated by a solenoid 34. Any number of inputs and outputs can be easily added to monitor the various functions in the robotic cell 10 or to initiate actions or send signals to man, machine, or software. The input/output can be simple on/off devices such as switches, relays, or solenoids, signal generators, power supplies, measurement equipment, sensors, tools, data or data streams whether serial or parallel, and signals whether digital or analog, or any other input or output desired for proper operation of the robotic cell 10.

The preferred embodiment additionally includes a series of cameras 36, 38, or special input devices that are mounted to the robotic arm 12 and frame 18 and act as optical sensors. The cameras 36, 38 can feed into one of the inputs on the central processing unit 14 (V1–V4, serial, parallel, special vision, or optically coupled are some of the possible connection schemes). The cameras 36, 38 may either incorporate built-in software and hence make decisions and send the results to the central processing unit 14 or other chosen device, or they may just send raw data to the central processing unit 14, a dedicated vision device, or to an additional controlling computer as desired. Any number of camera inputs can be utilized as necessary to perform the task or tasks desired. The second camera 38 of the present invention, and multiples of the camera if necessary, takes on a role as the master control in the current embodiment, which is commonly referred to as "MOM".

Much machine downtime in industrial equipment is attributed to faulty sensors. MOM 38 watches the entire robotic cell 10 and can replace virtually all sensors and mechanical stops. MOM 38 can turn the conveyor 26 on until a part is where it should be; and then turn off the conveyor 26. Precise location no longer matters because MOM 38 knows where the part is and can immediately tell the robotic cell 10 of the actual position. First camera 36 can then precisely see exactly the spot it intends to work, mimicking human hand-eye coordination. In the current embodiment MOM 38 can actually read the barcode, however the barcode scanner 28 is used to show the flexibility of the system. Cameras 36, 38 (and more if desired) can be used to monitor anything desired up to the limits the computers can reasonably economically process. This capability will continue to grow with computer advancements, and more and more vision based decisions and input will be used as processing power increases.

The cameras 36, 38 in the current embodiment are also used for real time calibration. If a robot attachment to the base 16 becomes loose, the robotic cell 10 will automatically recalibrate itself after it is re-tightened. If the feeder 22, jaws 24, or conveyor 26 are moved or replaced, the robotic cell 10 automatically compensates, dramatically reducing set up time and downtime.

Computer prices, speeds, memory, storage and video capabilities are just reaching the point where so many complex input/output functions can be integrated reasonably economically. The current embodiment demonstrates that many complex input/output can be multitasked for a very reasonable cost. This coupled with the easy to learn, open architecture software, allow people of very little skill to program applications, and people of average common software knowledge to customize and further enhance the basic code.

The robotic cell 10 can learn its environment with vision and automatically adapt when the environment is reasonably changed, such as when a major component or piece of tooling, such as a feeder, is repaired, replaced, or moved. This makes costly precision location of components unnecessary.

In addition, a base camera 39 (illustrated in FIG. 1) may be incorporated into the present design for the same type diagnostic and calibrations as described for cameras 36 and 38. The base camera 39 can more easily check robotic jaws 24 if looking up from the base 16 toward the robotic arm 12 and can see, identify, and measure tools or parts being carried in by the robotic arm 12. As a result, the combination of each of these cameras 36, 38, and 39 provides thorough monitoring and operational feedback of the various elements of the integrated robotic cell 10.

As previously mentioned, the ongoing cost of operating a robotic cell 10 can cost as much as the amortization of the purchase cost. Typically this type of robotic cell 10 is usually programmed and maintained by highly skilled engineers or technicians. The robotic cell 10 of this invention is however meant to be set-up, programmed, and run by average humans. The software interface is so simple that any human with average computer or electronic skills can quickly be trained to use this robotic cell 10.

Figure 2:
FIG. 2 is a representative listing of code conventionally used to control the operation of robotic cells.

FIG. 2 is a typical example of "modem" robotic cell software. These lines are only representative of the hundreds of lines necessary to perform simple tasks. These lines are from a high level language such as C++, Basic or Visual Basic. Many robotic cells develop their own language for use with their proprietary individual robot. There is no standard software. Consequently, once a specific robot brand is purchased, the purchaser must diligently train their employees to understand the software so that they can operate and maintain the equipment, the second robot a company buys is typically the same as the first one, only because a different brand would again require extensive training. This does not promote sufficient competition, because the second brand may be $5,000.00 cheaper but may cost $10,000.00 to train a new operator on the "new" software.

Figure 4:
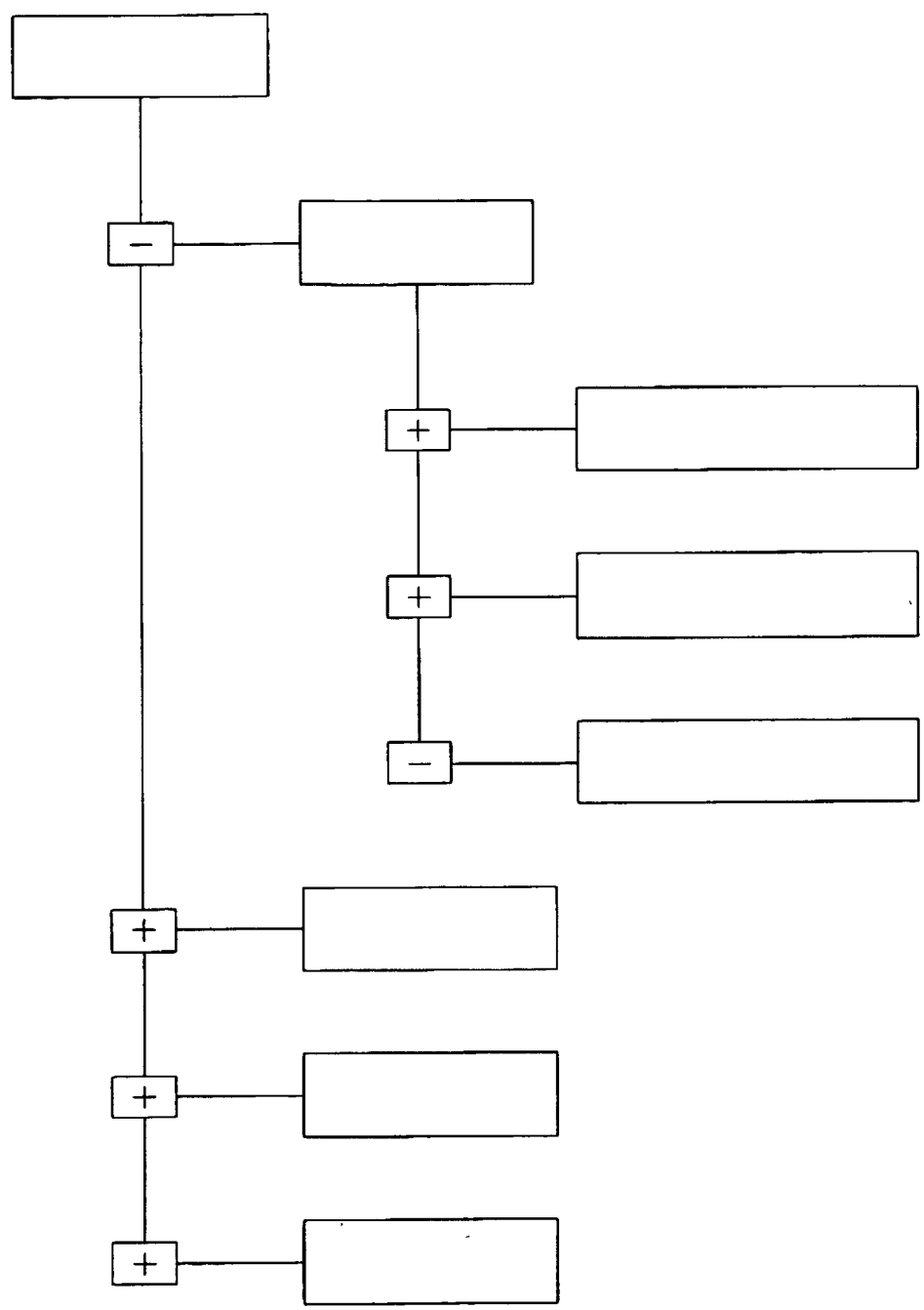
FIG. 4 is a schematic illustration of the prior art "tree" structure for accessing files.
Figure 5:
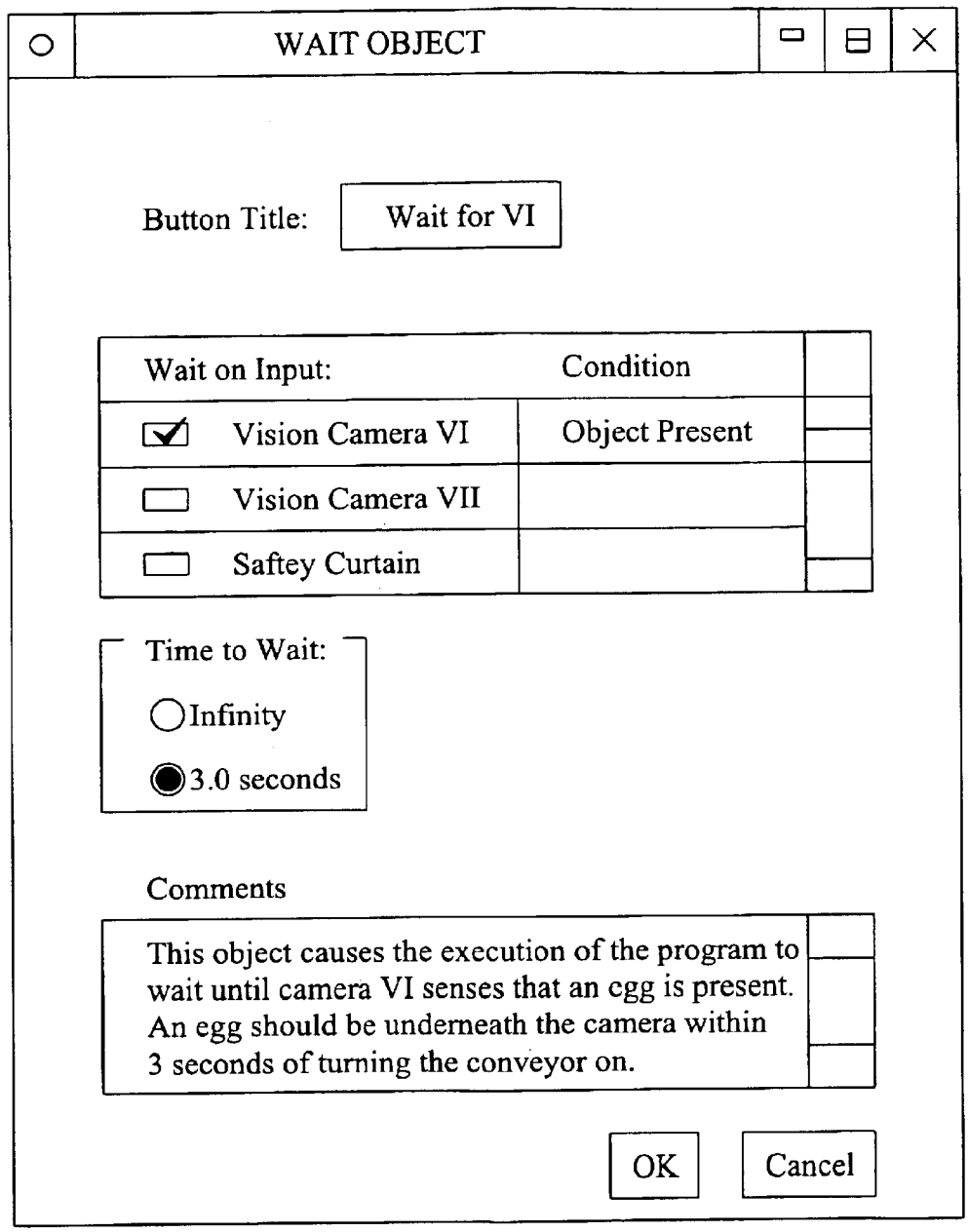
FIG. 5 is a schematic illustration of the graphical user interface used in the present invention by the operator for typical properties dialog box including comments.
Figure 18:
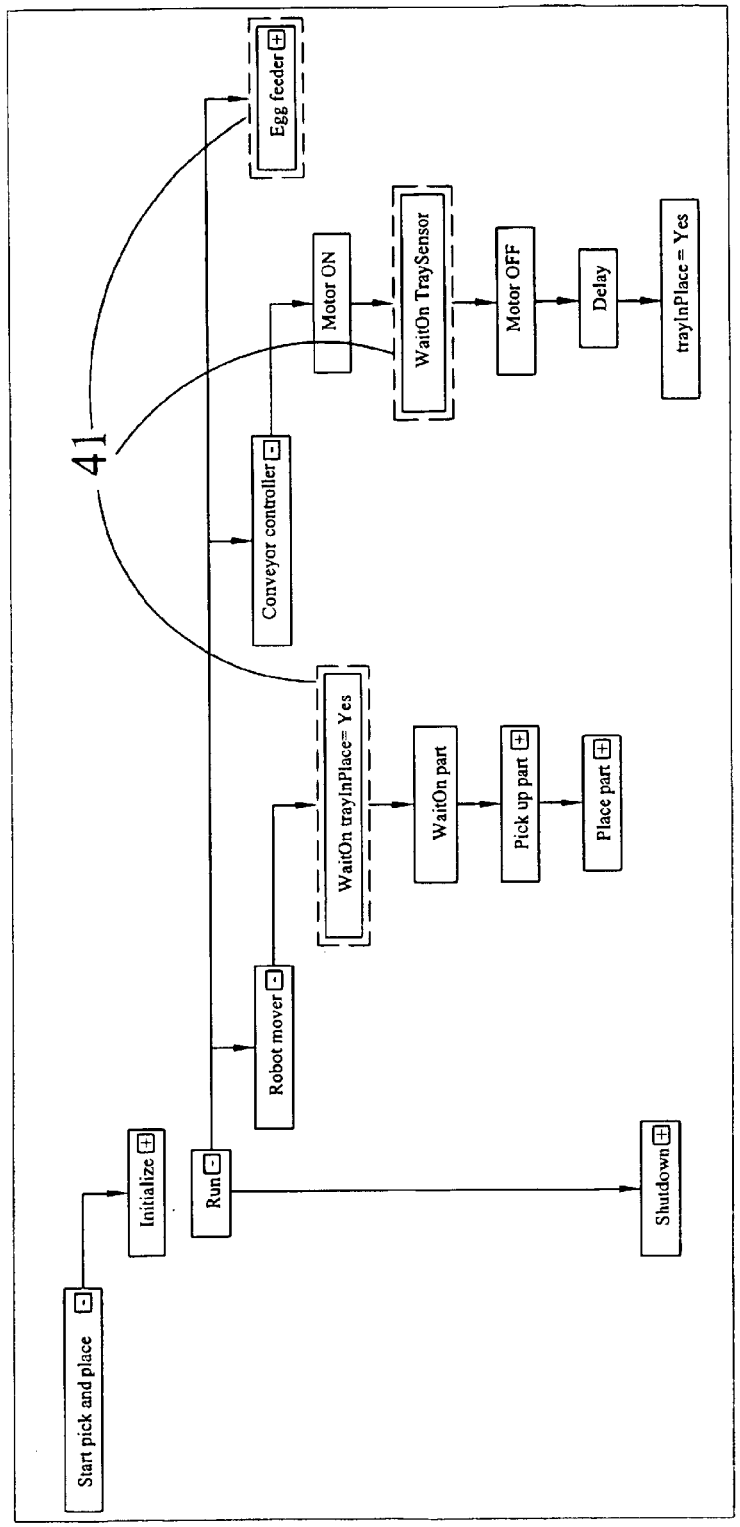
FIG. 18 is an illustration of the graphical user interface implemented in the present invention for an operator to control the operation of the robotic cell, this view being a combination of the views in FIG. 3 and FIG. 17.

The new software in the current embodiment functions much differently than existing robotic cell software. FIG. 18 shows a typical graphical user interface "page" of software for use in the new robotic cell 10. Although at first glance the software may look like Windows Explorer® (as used in Windows 95®, Windows 98®, Windows NT®, and Windows 2000®), it is vastly different. In an Explorer® view, folders are arranged in a tree structure, wherein everything branches from a single tree as is shown in FIG. 4.

Figure 3:
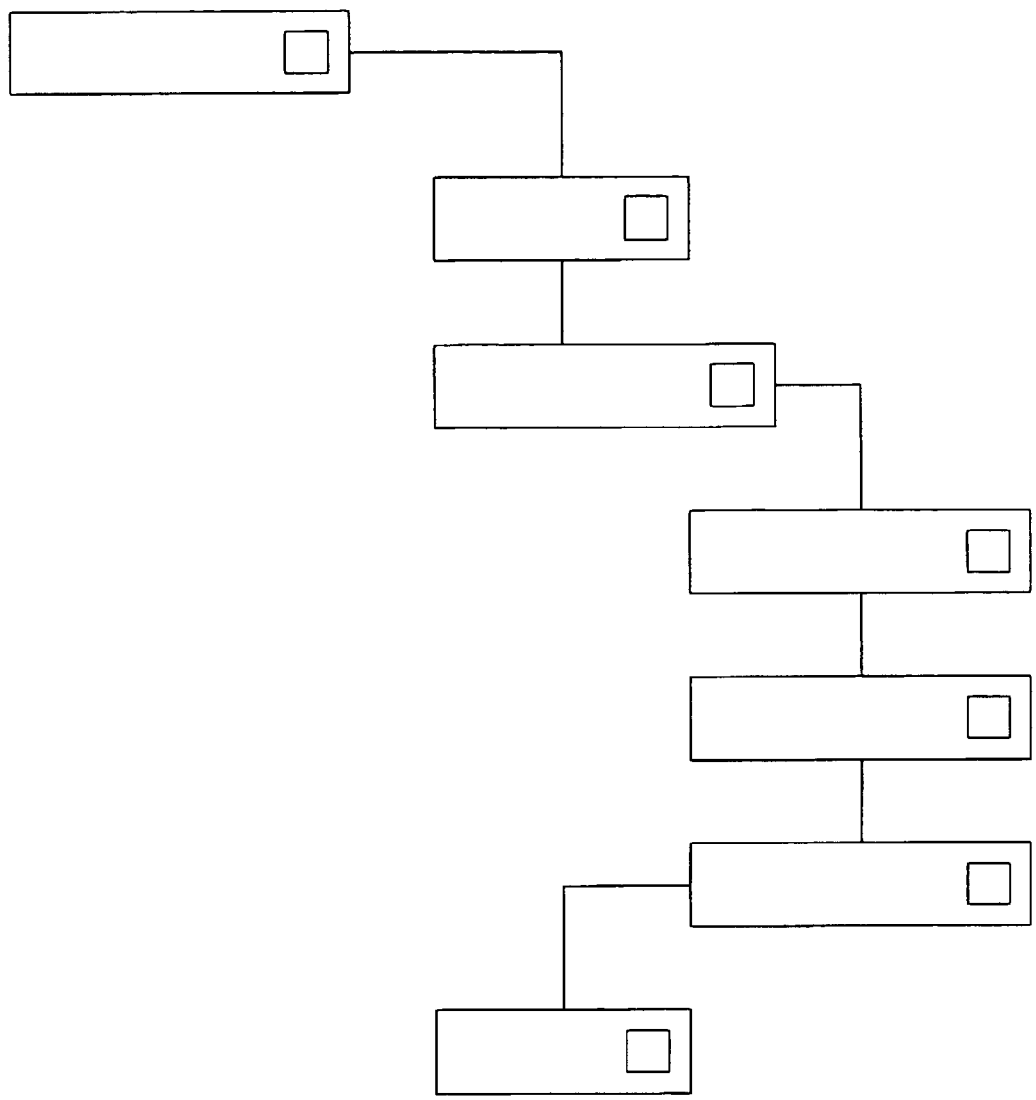
FIG. 3 is an illustration of the graphical user interface implemented in the present invention for an operator to control the operation of the robotic cell.

The new software allows a structure that perfectly illustrates a multitasking environment. It is very intuitive in that it shows multiple tasks being processed, for example, in two or more vertical paths simultaneously. In FIG. 18, a highlighted button 41, such as in the color green, indicates which program steps is being processed. This program is a multi-thread program (as is the program shown in FIG. 17). With multiple thread programs, multiple buttons may be highlighted (in green if preferred) (as shown in FIG. 3) to indicate simultaneous processing. In conventional software these tasks are typically either nested loops or subroutines located sometimes hundreds of lines later in conventional code. Average humans can be trained much quicker with the new software.

The new software interface can be used to control any robotic arm without looking any different to the operator. If for instance a different robotic arm 12 is used that needs to see 400 encoder counts to move ¼ inch in one axis, and the old robot needed 200 counts to move the same distance, a separate piece of code is maintained to tell the computer how many encoder counts equals a fixed distance. The operator only knows he wants to move ¼ inch in one axis for example.

Additionally, the software can use a button to select which type of robotic arm 12 is being used from the dozens of common robotic arms. Due to the open architecture, most any programmer can easily go deeper in the software and customize it for a model not included.

The operation of the robotic cell 10 is very simple. For instance, a move from one point to another is used in robotic cells 10. Traditional robotic cells can make this very technical, difficult, and time consuming. To train a human to set up a checker board usually takes less that a minute, but a typical robotic cell can take hours or days to write a program to do the same task.

To be useful the operator only needs to think in human terms. For instance if a desired task were to place eggs from a conveyor into a one dozen foam egg carton, the basic steps for this task are as follows:

1. Make sure it is safe, if not alert!
2. Turn on the conveyor until an egg is present. Then pick it up. (If one isn't there quickly alert the operator.)
3. Move it to inspection and measure it, if small trash it.
4. Make sure crate is present, precisely locate it.
5. Put egg in crate.
6. Verify egg is in crate.
7. If crate is full, get a new one.
8. Set alarm if refrigeration system quits.

Figure 7:
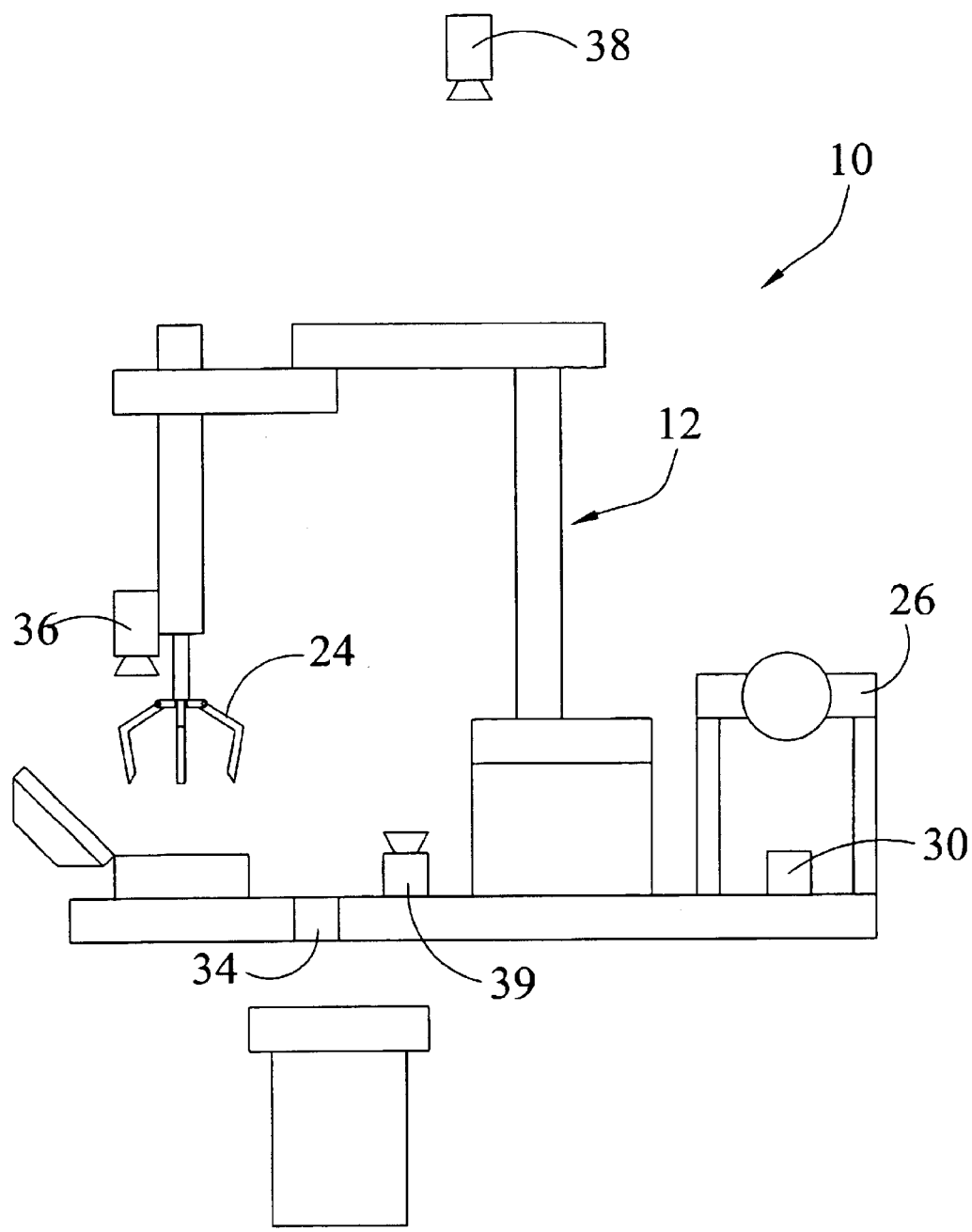
FIG. 7 is a schematic view of an integrated robotic cell of the present invention as used in a hypothetical example for collecting fragile eggs from a carton.

FIG. 7 shows a typical arrangement schematic for the robotic cell implementing this process.

Figures 8, 9:
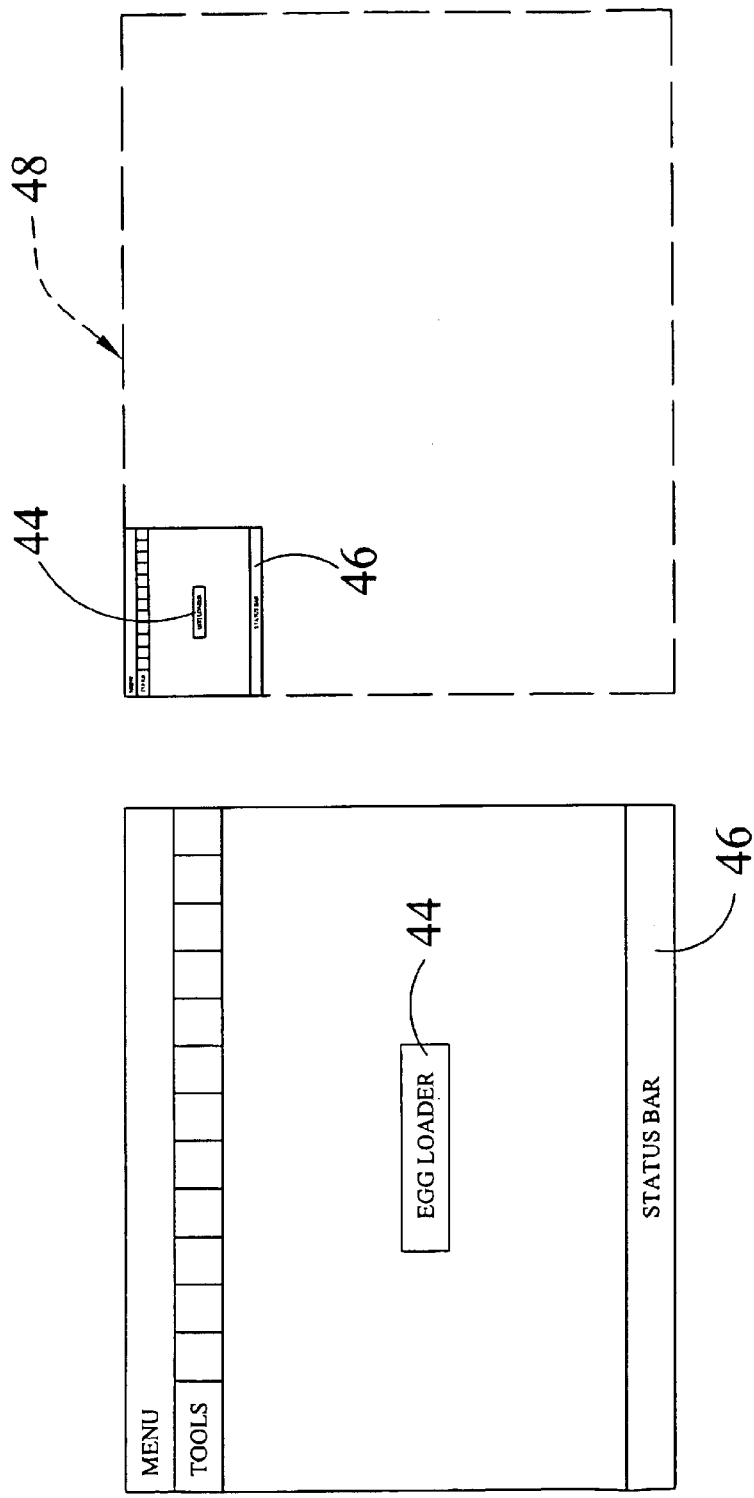
FIG. 8 illustrates the first software iteration from FIG. 7.
FIG. 9 illustrates the "One Page" Software.

The software is essentially one page as shown in FIG. 9 which is manipulated for viewing by any computer input device such as a mouse, cursor keys, voice command, etc.

The entire user interface for this project is shown graphically in FIGS. 8–17. FIG. 8 shows the graphical user interface to start this task. In the preferred embodiment, each "button" is preferably highlighted or color-coded green if it is active, although other colors can be used according to the standards set by the operator/owner. Each button preferably turns red if it has stopped and the current task is displayed in the status bar.

The software additionally contains intelligent defaults. All moves are run at the default speed, lifts, and acceleration shown on the setup page, as shown in FIG. 6. Any task can be varied from default values by selecting (or "double clicking") the task to be varied. Drag, drop, click, double click and other common techniques of computer input are discussed and described in the application, but it should be understood any form of input would be sufficient to make the software operate. Objects can be copied as needed to eliminate repetitive data input.

FIG. 8 shows the first steps in writing the eight tasks necessary to perform the egg loading task described earlier.

The first step is to hit a new program icon in the toolbar of FIG. 8 or menu selection. A box 44 appears on the screen. The user then is prompted to type in the name of the program as shown in box 44.

A status bar 46 appears at the bottom, which will later display every task as it runs. This status bar 46 automatically diagnoses a machine stopped by software and takes all guesswork out of why the machine stopped. As an example, if a sensor wire is cut, which stops the robotic cell 10, the status window would read "waiting for sensor on conveyor", which would tell you either that sensor is not working or the conveyor is not working. On complex cells with 50–100 sensors, this feature is invaluable.

FIG. 9 shows button 44, which is the same button shown in FIG. 8, as it would appear on the "whole page"; if it could be viewed at one time. Screen display 48 can be virtually any size needed and is only limited by the individual hardware, software or operating system limitations.

Figure 10:
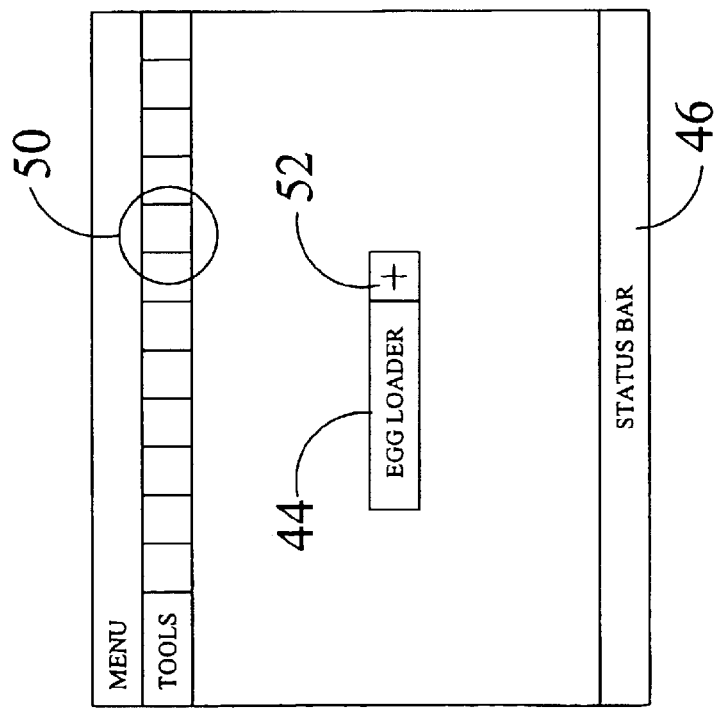
FIG. 10 illustrates the "starting a new page" of the project software.

The second step in creating the new program is shown in FIG. 10. To create a new "thread"(which is one of three this particular application will use) the "new thread" object icon 50 can be dragged onto the program name button 44. A "plus" button 52 appears on the title button indicating hidden content. Once the plus sign is selected by the operator, the screen will look like FIG. 11.

Figure 11:
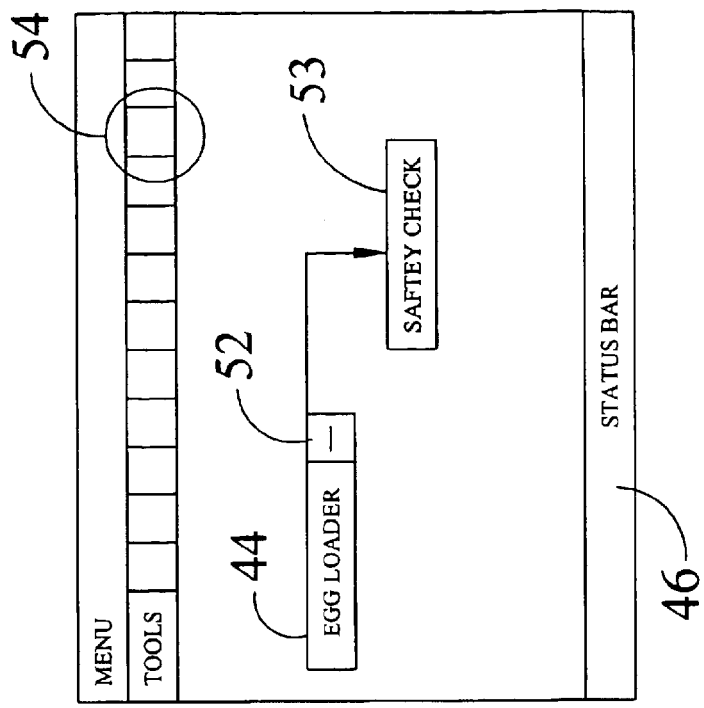
FIG. 11 illustrates the first software thread.

FIG. 11 shows the new box 53 where the new task name ("safety check") appears as entered. A new "wait" object 54 is placed into the safety check button. Similarly in FIG. 12, a new box 56 ("wait for SC") shows the name entered for this new wait button. This wait button was exposed by clicking the plus sign on the previously created button.

Figure 13:
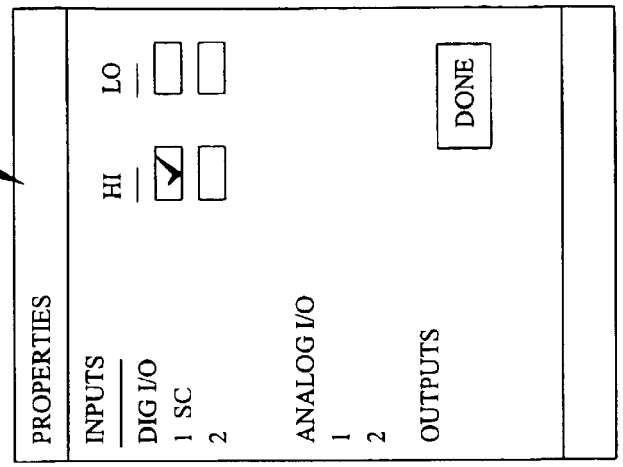
FIG. 13 illustrates a large view of software dialog box.
Figure 12:
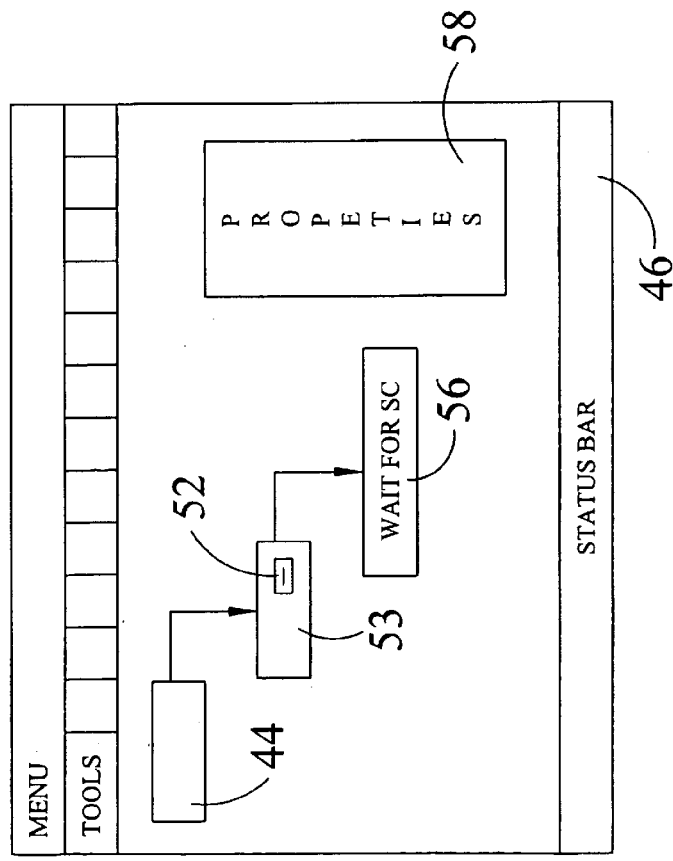
FIG. 12 illustrates a software "wait" object and its properties dialog box.

FIG. 12 indicates that double clicking the "Wait For SC" (Safety Curtain) button causes a properties window 58 to appear on the screen (the screen can auto zoom to show the entire project or current area or be user controlled). FIG. 13 is a larger view of the properties window 58. FIG. 13 shows adding a check mark selecting digital I/O port 1 going high as the event to wait for. This would indicate the safety curtain has detected an intrusion. The items on this window correlate to the setup window in FIG. 6. The done button makes the properties window 58 "collapse" or disappear.

Figure 14:
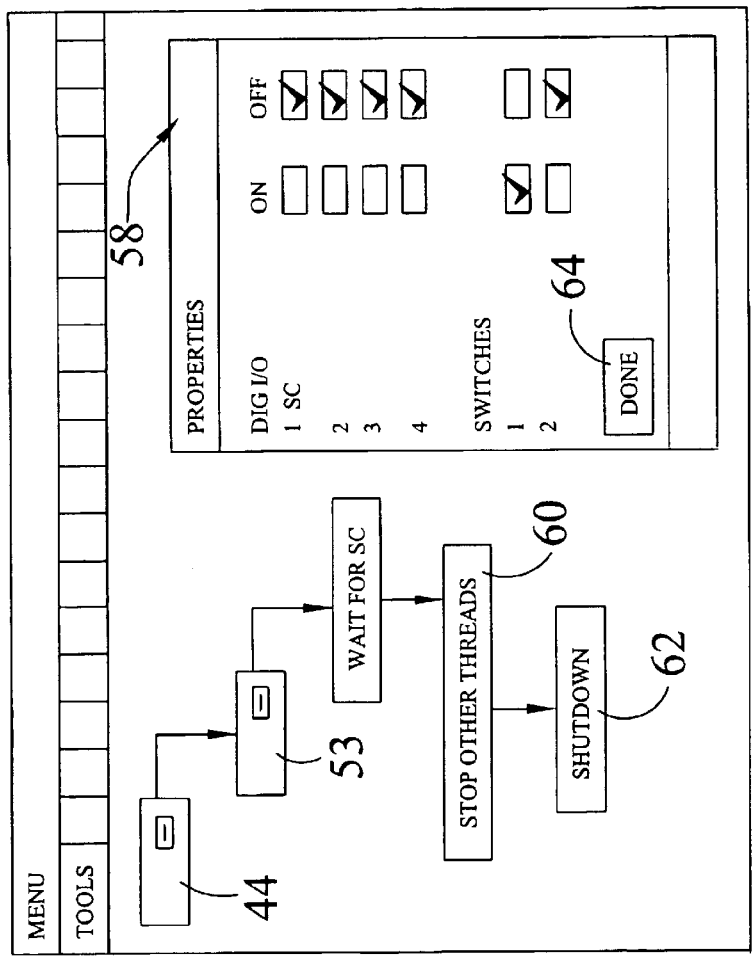
FIG. 14 illustrates a completion of first thread.
Figure 16:
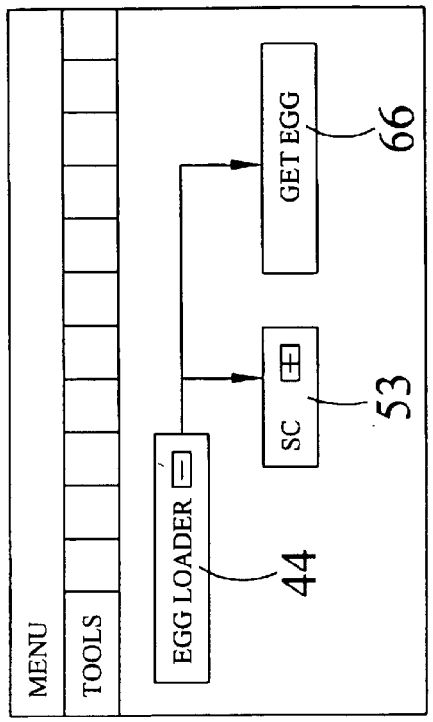
FIG. 16 illustrates a adding second thread screen.
Figure 15:
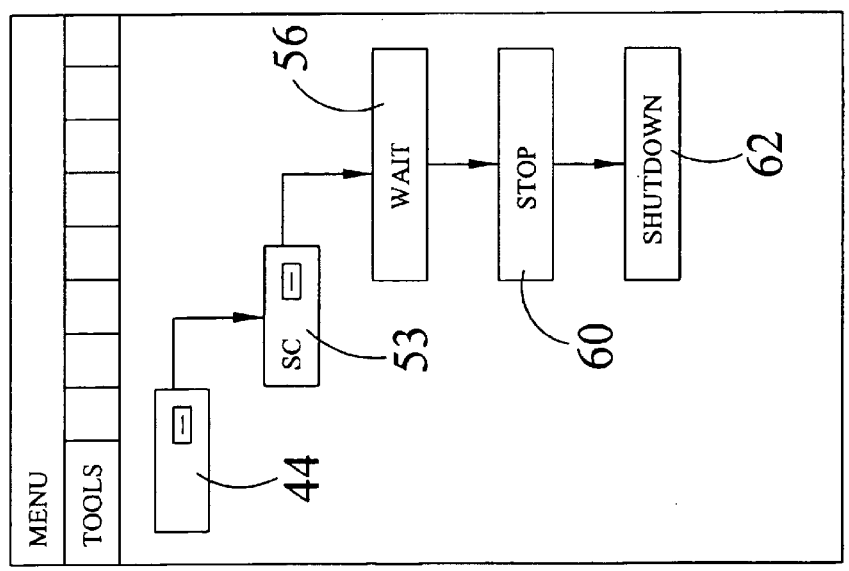
FIG. 15 illustrates a screen view, collapsing expanded thread.

FIG. 14 shows completion of the first thread. The "stop other threads" object icon 60 is dragged under the "wait for SC" button 56 and the "shut down" object icon 62 is dragged and dropped under the "stop other threads" button 60. The text on both buttons is input in the same manner as other buttons in the project. By selecting or double clicking the shut down button 62, the properties window 58 appears or "pops up". The actions desired are checked as shown in properties window 58 and done button 64 is "clicked". The screen now looks like FIG. 15.

The next task is to get an egg, which is done by dragging an object icon 66 onto the egg loader button 44 to show the label "get egg" typed on the newly created button.

Figure 17:
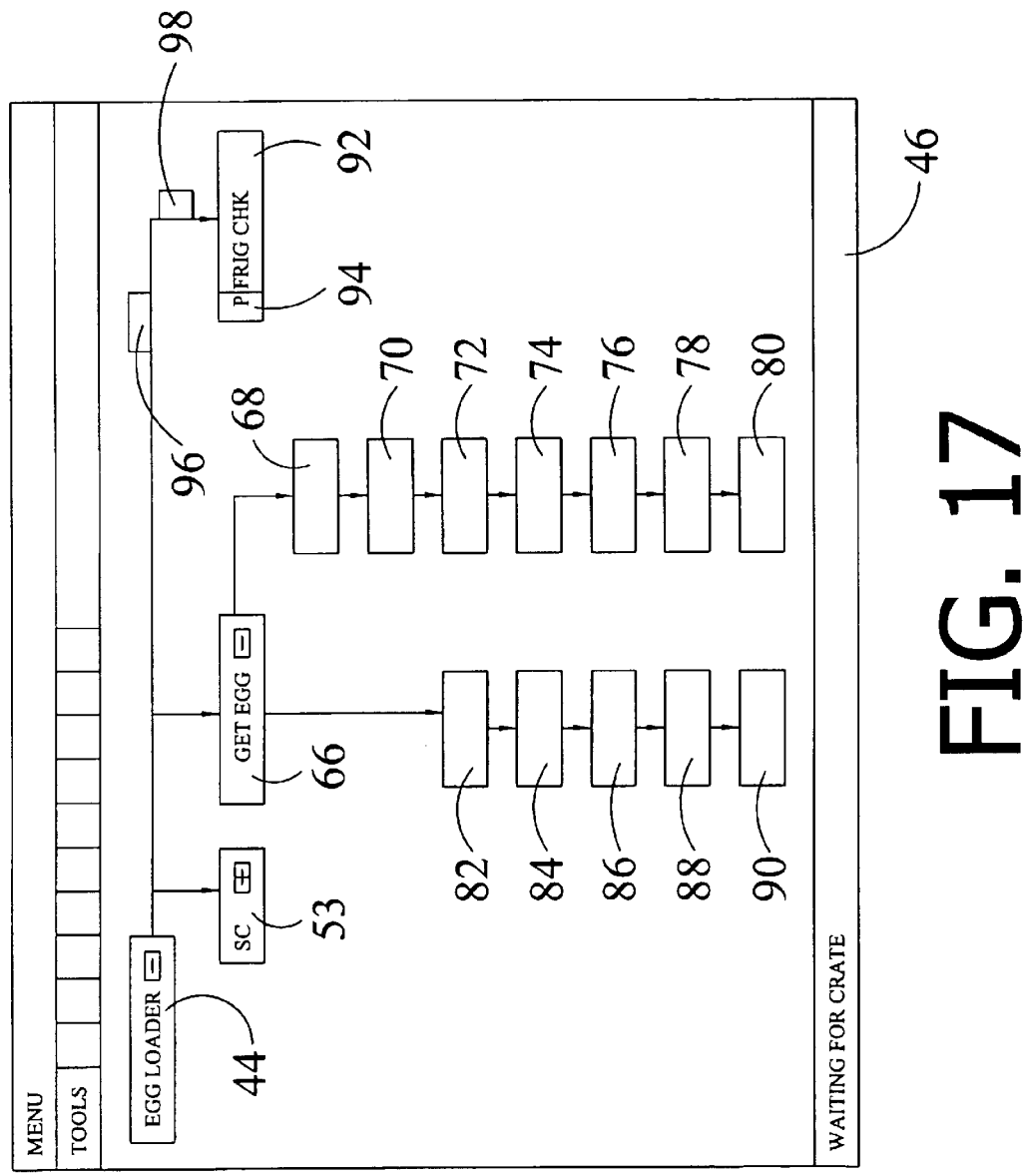
FIG. 17 illustrates a completed project screen.

FIG. 17 shows one view of this completed project. Icons 44, 53, and 66 are buttons shown previously. New icons are created similarly to the previous examples, and the function of the new buttons are described as follows: button 68 turns the conveyor on; button 70 waits until V1 shows egg is present; button 72 turns conveyor off; button 74 moves arm to point A; button 76 acquires V2 and sets point 'A' to V2 result; button 78 moves arm to new point 'A'; button 80 closes gripper; button 66 now has executed all of the buttons it contains then execution proceeds to button 82. Button 82 checks size of egg; button 84 waits for crate; button 86 moves to point 'C'; button 88 acquires V2 and set to a point to V2 result and moves there; button 90 opens gripper. In addition, button 92 is a new thread "Frig check" which checks to make sure the room temperature is not too high and shuts down the system to keep from slow cooking the eggs, and button 96 is a disable icon that can be dragged to any thread to temporarily stop the function. In this case if the temperature sensor fails the robot can quickly be restarted and run until the failure can be corrected. Button 98 is the "skip this step" object icon which can be used to skip any particular step button. Button 94 is a pause object icon. When dropped on a button the program stops or pauses when it gets to this step.

The present invention solves or enhances all obstacles to make ultra wide spread use of robotics feasible in today's economic environment.

Thus, although there have been described particular embodiments of the present invention of a new and useful INTEGRATED ROBOTIC CELL, it is not intended that such references be construed as limitations upon the scope of this invention except as set forth in the following claims.

What is claimed is:

1. An integrated robotic cell for processing a component as directed by an operator, said integrated robotic cell comprising:

a robotic arm;

a central processing unit connected to said robotic arm, said central processing unit controlling the operation of said robotic arm;

optical sensor means for monitoring said robotic cell;

interface means for receiving commands from the operator, said interface means being connected to said central processing unit, said interface means comprising a display device for displaying a plurality of icons, each of said icons corresponding to at least one task to be performed by said robotic cell; and an input sensor connected to said central processing unit, said input sensor positioned proximate said feeder to monitor the position of the component.

2. The integrated robotic cell as described in claim 1, further comprising a frame.

3. The integrated robotic cell as described in claim 1 further comprising:

a feeder to direct the component toward said robotic arm.

4. An integrated robotic cell for processing a component as directed by an operator, said integrated robotic cell comprising:

a robotic arm;

a central processing unit connected to said robotic arm, said central processing unit controlling the operation of said robotic arm;

optical sensor means for monitoring said robotic cell;

interface means for receiving commands from the operator, said interface means being connected to said central processing unit; and a frame, wherein said optical sensor means comprises:

a first camera connected to said robotic arm and electronically linked to said central processing unit, said first camera monitoring said robotic arm; and a second camera connected to said frame and electronically linked to said central processing unit, said second camera monitoring said robotic cell.

5. An integrated robotic cell for processing a component as directed by an operator, said integrated robotic cell comprising:

a robotic arm;

a central processing unit connected to said robotic arm, said central processing unit controlling the operation of said robotic arm;

optical sensor means for monitoring said robotic cell; and interface means for receiving commands from the operator, said interface means being connected to said central processing unit, wherein said optical sensor means comprises a camera positioned below said robotic arm, said camera connected to said central processing unit.

6. An integrated robotic cell for processing a component as directed by an operator, said integrated robotic cell comprising:

a robotic arm;

a central processing unit connected to said robotic arm, said central processing unit controlling the operation of said robotic arm;

optical sensor means for monitoring said robotic cell;

interface means for receiving commands from the operator, said interface means being connected to said central processing unit;

a feeder to direct the component toward said robotic arm;

a reject sensor to monitor the component; and a reject arm connected to said reject sensor to remove the component from said feeder.

7. A robotic cell assembly for precisely controlling the position of a component and a robotic arm within a frame as dictated by an operator, said assembly comprising:

a central processing unit for directing the operation of the robotic arm;

optical sensor means for monitoring said robotic cell assembly, said optical sensor means being connected to said central processing unit;

an interface display connected to said central processing unit, said interface display communicating commands from the operator to said central processing unit, said commands for controlling operation of the robotic cell assembly; and a frame, wherein said optical sensor means comprises:

at least one camera supported by said frame and connected to said central processing unit, said camera monitoring the position of said robotic arm and the component.

8. A robotic cell assembly for precisely controlling the position of a component and a robotic arm within a frame as dictated by an operator, said assembly comprising:

a central processing unit for directing the operation of the robotic arm;

optical sensor means for monitoring said robotic cell assembly, said optical sensor means being connected to said central processing unit;

an interface display connected to said central processing unit, said interface display communicating commands from the operator to said central processing unit, said commands for controlling operation of the robotic cell assembly; and a frame, wherein said optical sensor means comprises:

a first camera connected to said frame and electronically linked to said central processing unit, said first camera monitoring the robotic arm; and a second camera connected to said frame and electronically linked to said central processing unit, said second camera monitoring the robotic cell assembly.

9. A robotic cell assembly for precisely controlling the position of a component and a robotic arm within a frame as dictated by an operator, said assembly comprising:

a central processing unit for directing the operation of the robotic arm;

optical sensor means for monitoring said robotic cell assembly, said optical sensor means being connected to said central processing unit; and an interface display connected to said central processing unit, said interface display communicating commands from the operator to said central processing unit, said commands for controlling operation of the robotic cell assembly, wherein said optical sensor means comprises a third camera positioned below said robotic arm, said camera connected to said central processing unit.

10. A robotic cell assembly for precisely controlling the position of a component and a robotic arm within a frame as dictated by an operator, said assembly comprising:

a central processing unit for directing the operation of the robotic arm;

optical sensor means for monitoring said robotic cell assembly, said optical sensor means being connected to said central processing unit;

an interface display connected to said central processing unit, said interface display communicating commands from the operator to said central processing unit, said commands for controlling operation of the robotic cell assembly, said interface display configured to display a plurality of icons, each of said icons corresponding to at least one task to be performed by said robotic cell assembly;

a feeder to direct the component toward said robotic arm; and an input sensor connected to said central processing unit, said input sensor positioned proximate said feeder to monitor the position of the component.

11. A robotic cell assembly for precisely controlling the position of a component and a robotic arm within a frame as dictated by an operator, said assembly comprising:

a central processing unit for directing the operation of the robotic arm;

optical sensor means for monitoring said robotic cell assembly, said optical sensor means being connected to said central processing unit; and an interface display connected to said central processing unit, said interface display communicating commands from the operator to said central processing unit control operation of the robotic cell assembly;

a feeder to direct the component toward said robotic arm;

a reject sensor to monitor the component; and a reject arm connected to said reject sensor to remove the component from said feeder.

12. A method for controlling a robotic arm to engage a component within an integrated robotic cell as directed by an operator, said method comprising the steps of:

a) providing optical sensing means mounted in the integrated robotic cell to examine the integrated robotic cell;

b) continuously sending a signal from said optical sensing means to a central processing unit;

c) concomitantly positioning the robotic arm and the component within the integrated robotic cell; and d) controlling the action of the robotic arm by the operator using an interface display, wherein step a) further comprises the steps of:

connecting a first camera to a frame to view the integrated robotic cell; and sending a signal from said camera to said central processing unit.

13. The method as described 12 further comprising the steps of:

positioning a second camera below the robotic arm, said second camera connected to said central processing unit; and sending a signal from said second camera to said central processing unit.

14. An integrated robotic cell for processing a component as directed by an operator, said integrated robotic cell comprising:

a robotic arm;

an optical sensor;

logic configured to automatically control the operation of said robotic arm based on data from said optical sensor;

an interface device configured to receive commands from the operator, the commands for controlling the operation of the robotic arm, the interface device configured to produce an image displaying a plurality of icons, each of said icons corresponding to at least one task to be performed by said robotic cell; and a frame, wherein said optical sensor comprises a first camera connected to said robotic arm and a second camera connected to said frame.

15. An integrated robotic cell for processing a component as directed by an operator, said integrated robotic cell comprising:

a robotic arm;

a frame;

a first camera connected to said robotic arm;

a second camera connected to said frame;

control logic configured to automatically control the operation of said robotic arm based on data from said first and second cameras; and an interface device configured to receive commands from the operator, the commands for controlling the operation of the robotic arm.

* * * * *